United States Patent
Shimamoto et al.

(10) Patent No.: US 9,621,750 B2
(45) Date of Patent: Apr. 11, 2017

(54) IMAGE FORMING SYSTEM THAT MOVES PRINT JOB BETWEEN A PLURALITY OF IMAGE FORMING APPARATUSES AND RECORDING MEDIUM

(71) Applicant: Kyocera Document Solutions Inc., Osaka (JP)

(72) Inventors: Kunihiko Shimamoto, Osaka (JP); Tomohiro Kawasaki, Osaka (JP); Yoshitaka Matsuki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/137,015

(22) Filed: Apr. 25, 2016

(65) Prior Publication Data

US 2016/0316080 A1 Oct. 27, 2016

(30) Foreign Application Priority Data

Apr. 25, 2015 (JP) .................................. 2015-089896

(51) Int. Cl.
*H04N 1/00* (2006.01)

(52) U.S. Cl.
CPC ..... *H04N 1/00411* (2013.01); *H04N 1/00323* (2013.01); *H04N 1/00493* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,288,790 B1* | 9/2001 | Yellepeddy | ........... | G06F 3/1204 358/1.13 |
| 6,944,412 B2* | 9/2005 | Mishima | ............ | G03G 15/5016 345/581 |
| 2002/0001104 A1* | 1/2002 | Shima | .................... | G06K 15/00 358/442 |
| 2003/0016374 A1* | 1/2003 | Christodoulou | ...... | G06F 3/1204 358/1.12 |

(Continued)

FOREIGN PATENT DOCUMENTS

JP 2012-029164 A 2/2012
JP 2013-161246 A 8/2013

*Primary Examiner* — Ming Hon
(74) *Attorney, Agent, or Firm* — James Judge

(57) ABSTRACT

An image forming system includes a portable terminal device and an image forming apparatus. The portable terminal device includes a job information acquisition circuit, an augmented reality circuit, and a job moving circuit. The job information acquisition circuit acquires job information indicative of the print job executed by the image forming apparatus. The augmented reality circuit causes a display device to display a composite image where a job information image based on the job information acquired by the job information acquisition circuit is combined on a location corresponding to the image forming apparatus on a captured image captured by an imaging device. The job moving circuit moves the print job between the plurality of image forming apparatuses corresponding to an operation input by an input device with respect to the job information image displayed on the display device by the augmented reality circuit.

3 Claims, 19 Drawing Sheets

(56) References Cited

U.S. PATENT DOCUMENTS

| | | | | |
|---|---|---|---|---|
| 2003/0090697 | A1* | 5/2003 | Lester | H04L 67/1008 358/1.14 |
| 2006/0244998 | A1* | 11/2006 | Salgado | G06K 15/00 358/1.16 |
| 2007/0177185 | A1* | 8/2007 | Ogura | G06F 3/1208 358/1.14 |
| 2008/0239365 | A1* | 10/2008 | Salgado | G06F 17/212 358/1.15 |
| 2010/0002251 | A1* | 1/2010 | Tachibana | G06F 3/0488 358/1.15 |
| 2013/0077124 | A1* | 3/2013 | Vojak | G06F 3/1292 358/1.14 |
| 2014/0063542 | A1* | 3/2014 | Aoki | G06F 3/1296 358/1.15 |
| 2015/0103367 | A1* | 4/2015 | Tsujita | G06K 15/4065 358/1.13 |
| 2015/0365542 | A1* | 12/2015 | Kim | H04N 1/00079 358/1.14 |

\* cited by examiner

| Order | User ID | Number of Sheets | Number of Copies |
|---|---|---|---|
| 5 | USER001 | 20 | 1 |
| 4 | USER002 | 10 | 20 |
| 3 | USER003 | 5 | 1 |
| 2 | USER002 | 10 | 20 |
| 1 | USER004 | 10 | 1 |

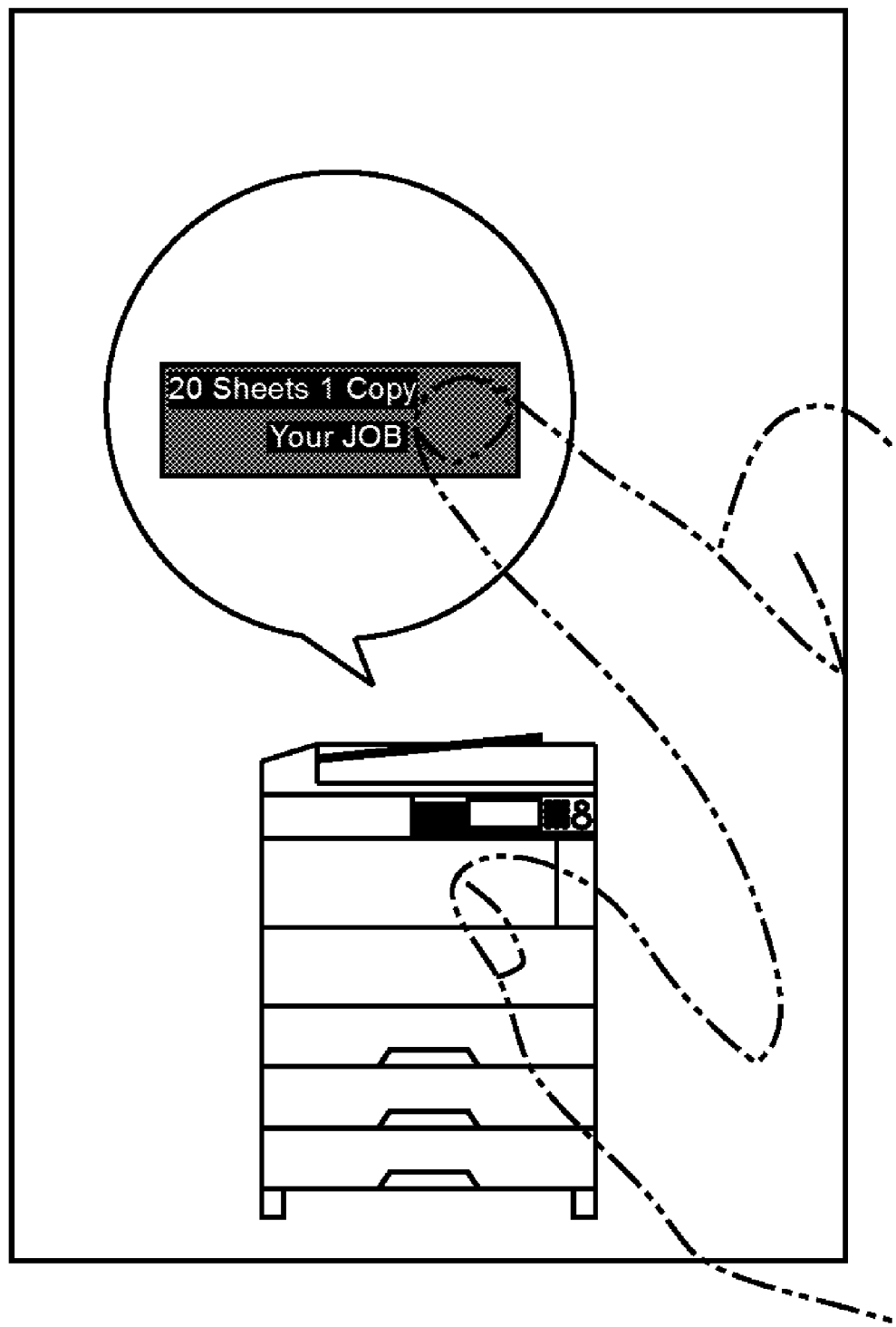

IMAGE FORMING SYSTEM THAT MOVES PRINT JOB BETWEEN A PLURALITY OF IMAGE FORMING APPARATUSES AND RECORDING MEDIUM

INCORPORATION BY REFERENCE

This application is based upon, and claims the benefit of priority from, corresponding Japanese Patent Application No. 2015-089896 filed in the Japan Patent Office on Apr. 25, 2015, the entire contents of which are incorporated herein by reference.

BACKGROUND

Unless otherwise indicated herein, the description in this section is not prior art to the claims in this application and is not admitted to be prior art by inclusion in this section.

An image forming system that combines a state of an image forming apparatus with a captured image on a location corresponding to the image forming apparatus is known.

SUMMARY

An image forming system according to one aspect of the disclosure includes a portable terminal device and an image forming apparatus. The portable terminal device includes an imaging device, a display device, and an input device. The image forming apparatus executes a print job. The portable terminal device includes a job information acquisition circuit, an augmented reality circuit, and a job moving circuit. The job information acquisition circuit acquires job information indicative of the print job executed by the image forming apparatus. The augmented reality circuit causes the display device to display a composite image where a job information image based on the job information acquired by the job information acquisition circuit is combined on a location corresponding to the image forming apparatus on a captured image captured by the imaging device. The job moving circuit moves the print job between the plurality of image forming apparatuses corresponding to an operation input by the input device with respect to the job information image displayed on the display device by the augmented reality circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 illustrates a schematic diagram of exemplary job information according to the one embodiment.

FIG. 17B illustrates a schematic diagram of an exemplary state where the swipe was executed from the state illustrated in FIG. 17A.

DETAILED DESCRIPTION

Figure 1:
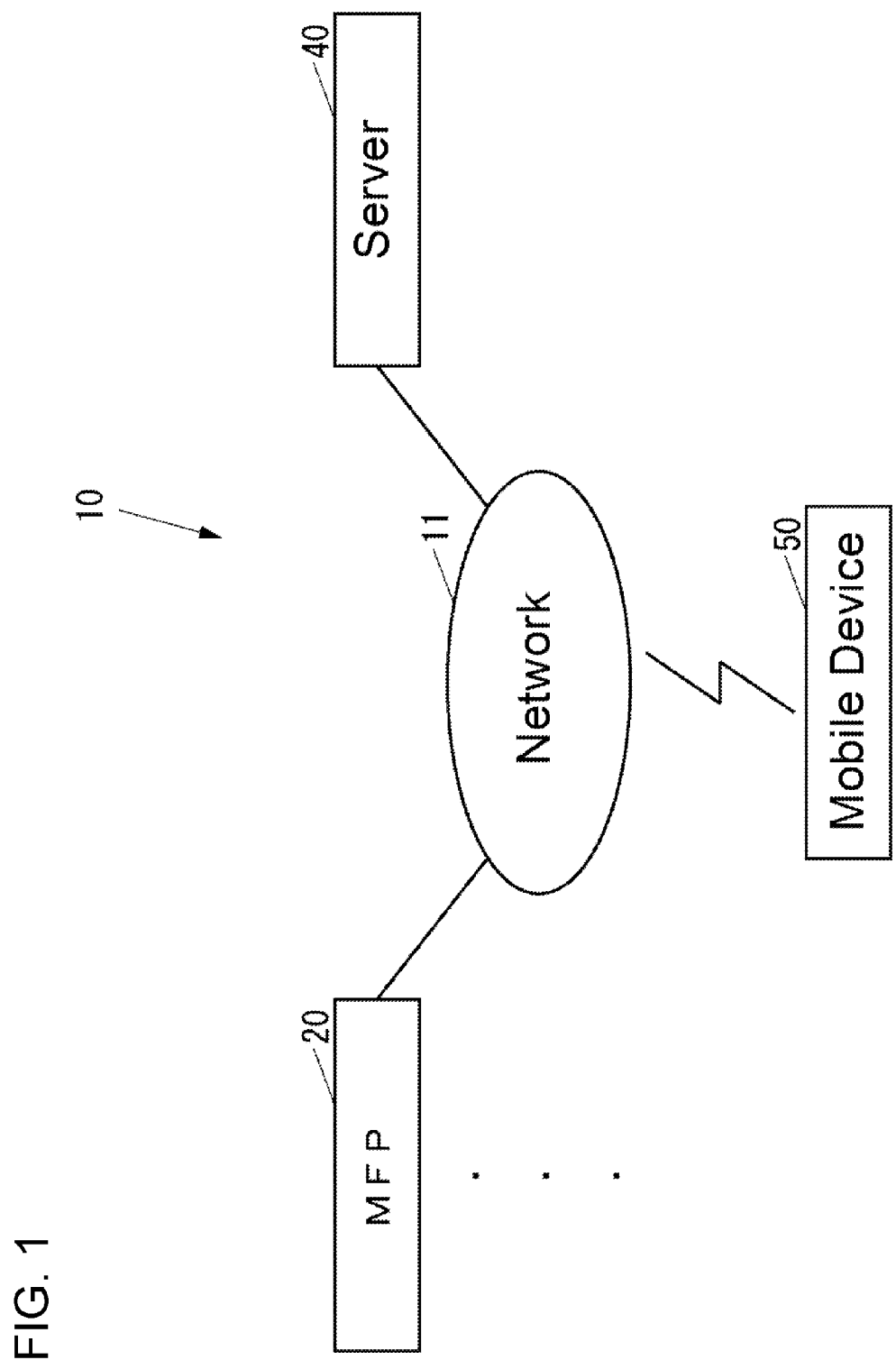
FIG. 1 illustrates a configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of this disclosure using the drawings.

First, a configuration of an image forming system 10 according to the embodiment will be described.

FIG. 1 illustrates the image forming system 10 according to the embodiment.

As illustrated in FIG. 1, the image forming system 10 includes a plurality of MFPs including a multifunction peripheral (MFP) 20, a server 40 such as a personal computer (PC) that controls these plurality of MFPs, and a mobile device 50 such as a smart phone, a tablet, and a small PC. The plurality of MFPs, the server 40, and the mobile device 50 of the image forming system 10 are communicatively connected together via a network 11 such as a local area network (LAN) or the Internet. The mobile device 50 configures a portable terminal device of the disclosure.

Each configuration of the plurality of MFPs of the image forming system 10 is similar to the configuration of the MFP 20. Therefore, a description will be given of the MFP 20 below as a representative of the plurality of MFPs of the image forming system 10.

Figure 2:
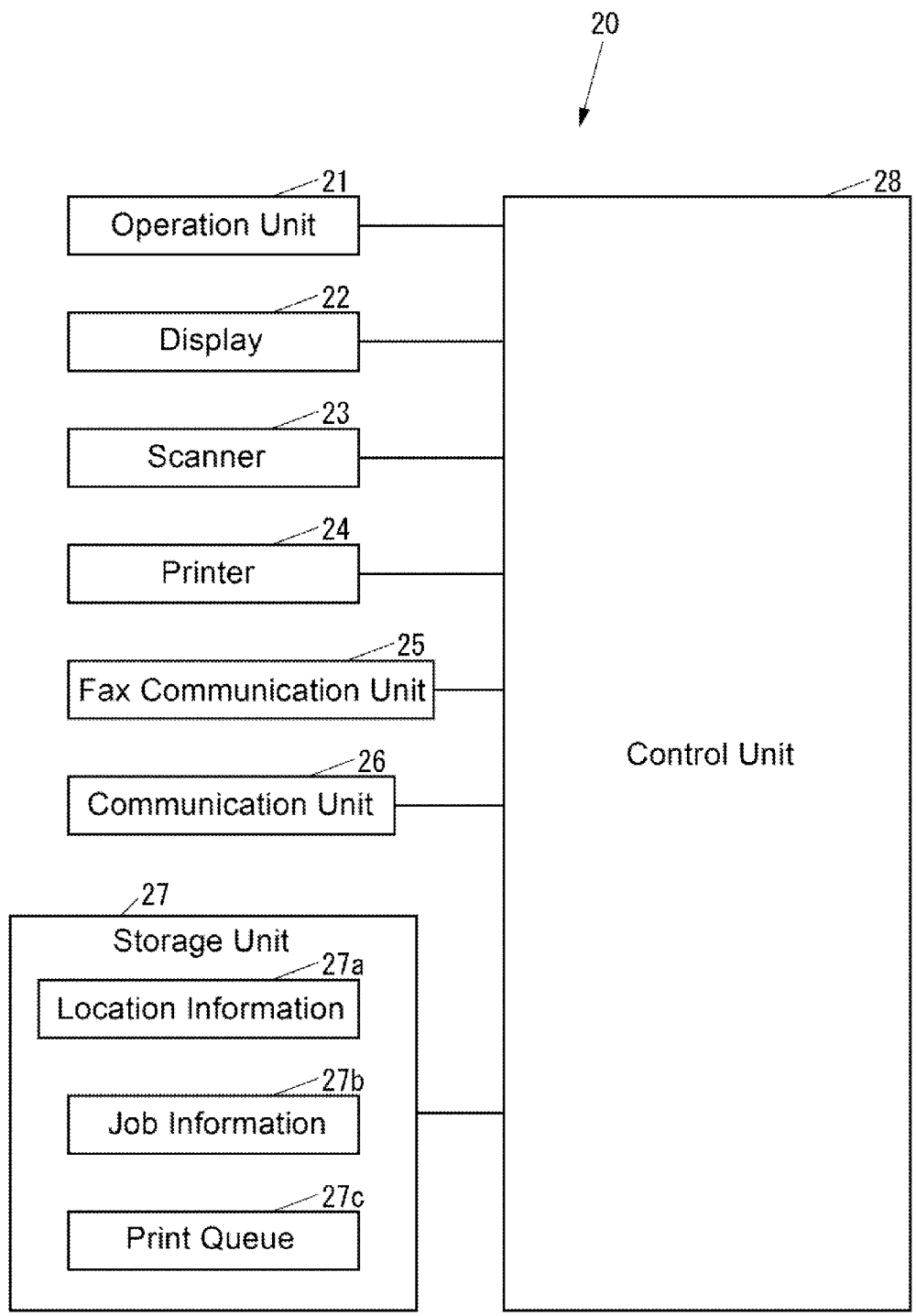
FIG. 2 illustrates a functional block configuration of an MFP according to the one embodiment.

FIG. 2 illustrates the MFP 20.

As illustrated in FIG. 2, the MFP 20 includes an operation unit 21, a display 22, a scanner 23, a printer 24, a fax communication unit 25, a communication unit 26, a storage unit 27, and a control unit 28. The operation unit 21 is an input device such as a button where various kinds of operations are input by a user. The display 22 is a display device such as a liquid crystal display (LCD) that displays various kinds of information. The scanner 23 is a reading device that reads an image from an original document. The printer 24 is a print device that prints on a recording medium such as a paper sheet. The fax communication unit 25 is a fax device that executes a fax communication via a communication line such as a dial-up line with an external facsimile device (not illustrated). The communication unit 26 is a communication device that communicates with external devices via the network 11 (see FIG. 1). The storage unit 27 is a non-volatile storage device such as an electrically erasable programmable read only memory (EEPROM) or a hard disk drive (HDD) that stores various kinds of data. The control unit 28 controls the entire MFP 20.

The storage unit 27 stores location information 27a, job information 27b, and a print queue 27c of the MFP 20. The job information 27b illustrates a print job executed by the MFP 20. The print queue 27c stores target print data for the print job in the order to be executed by the MFP 20.

The control unit 28 includes, for example, a central processing unit (CPU), a read only memory (ROM), and a random access memory (RAM). The ROM stores programs and various kinds of data. The RAM is used as a work area of the CPU. The CPU can execute the programs stored in the ROM or the storage unit 27.

FIG. 3 illustrates exemplary job information 27b.

As illustrated in FIG. 3, the job information 27b includes the print job order to be executed by the MFP 20, a user ID as user identification information, the number of printed sheets per copy on the print job, and the number of copies on the print job, for each print job.

Figure 4:
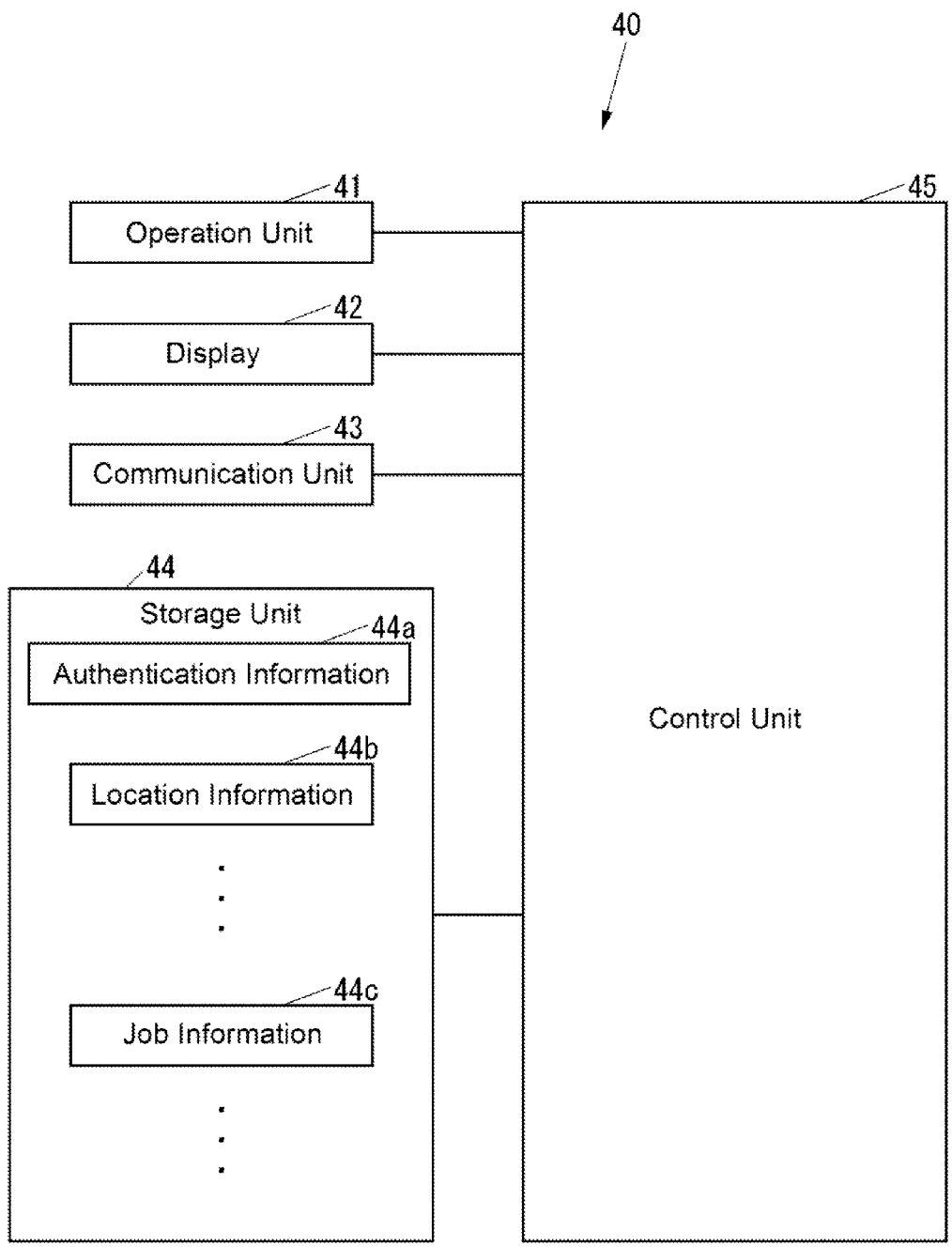
FIG. 4 illustrates a functional block configuration of a server according to the one embodiment.

FIG. 4 illustrates the server 40.

As illustrated in FIG. 4, the server 40 includes an operation unit 41, a display 42, a communication unit 43, a storage unit 44, and a control unit 45. The operation unit 41 is an input device such as a computer mouse or a keyboard where various kinds of operations are input by a user. The display 42 is a display device such as an LCD that displays various kinds of information. The communication unit 43 is a communication device that communicates with external devices via the network 11 (See FIG. 1). The storage unit 44 is a non-volatile storage device such as an HDD that stores various kinds of data. The control unit 45 controls the entire server 40.

The storage unit 44 stores authentication information 44a to authenticate the user, such as a combination of the user ID and a password. The storage unit 44 stores location information 44b of the MFP and job information 44c that illustrates the print job executed by the MFP, for each MFP included in the image forming system 10 (See FIG. 1).

The control unit 45 includes, for example, a CPU, a ROM, and a RAM. The ROM stores programs and various kinds of data. The RAM is used as a work area of the CPU. The CPU executes the programs stored in the ROM or the storage unit 44.

Figure 5:
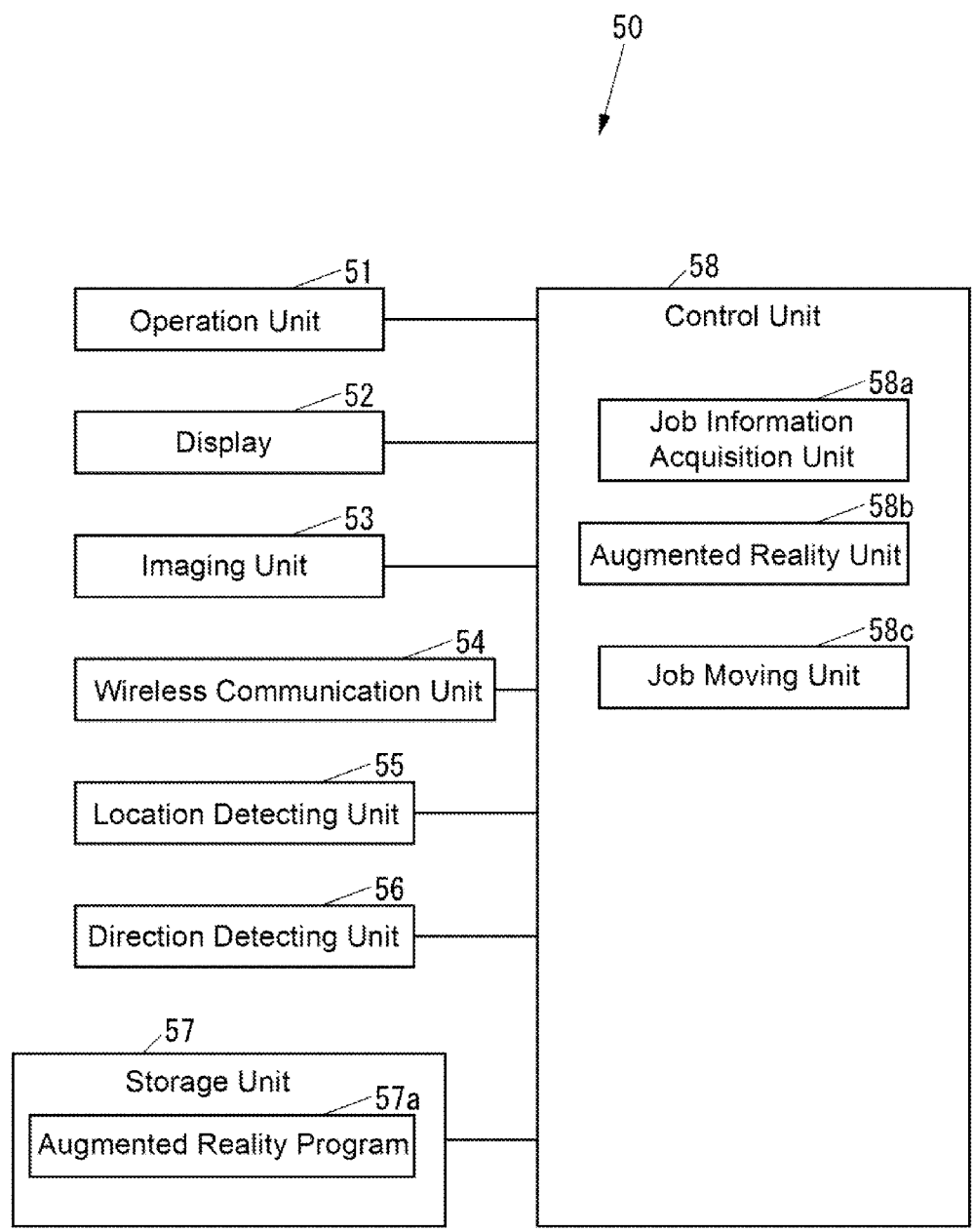
FIG. 5 illustrates a functional block configuration of a mobile device according to the one embodiment.

FIG. 5 illustrates the mobile device 50.

As illustrated in FIG. 5, the mobile device 50 includes an operation unit 51, a display 52, an imaging unit 53, a wireless communication unit 54, a location detecting unit 55, a direction detecting unit 56, a storage unit 57, and a control unit 58. The operation unit 51 is an input device such as a button where various kinds of operations are input. The display 52 is a display device such as an LCD that displays various kinds of information. The imaging unit 53 is an imaging device. The wireless communication unit 54 is a communication device that communicates with external devices via the network 11 (See FIG. 1) by wireless communication. The location detecting unit 55 is a location detecting device such as a global positioning system (GPS) receiver that detects a current location of the mobile device 50 in a real space. The direction detecting unit 56 is a direction detecting device such as an acceleration sensor that detects a current direction of the mobile device 50 in a real space. The storage unit 57 is a non-volatile storage device such as an HDD that stores programs and various kinds of data. The control unit 58 controls the entire mobile device 50.

The operation unit 51 includes an input device that constitutes a touch panel with the display 52.

The storage unit 57 stores an augmented reality (AR) program 57a that the control unit 58 executes. The augmented reality program 57a may be installed in the mobile device 50 at production stage of the mobile device 50, may be installed additionally in the mobile device 50 from an external storage medium such as a universal serial bus (USB) memory, and may be installed additionally in the mobile device 50 from the network 11.

The control unit 58 includes, for example, a CPU, a ROM, and a RAM. The ROM stores programs and various kinds of data. The RAM is used as a work area of the CPU. The CPU can execute the programs stored in the ROM or the storage unit 57.

The control unit 58 functions as a job information acquisition unit (referred to as a job information acquisition circuit) 58a, an augmented reality unit (referred to as an augmented reality circuit) 58b, and a job moving unit (referred to as a job moving circuit) 58c. The job information acquisition unit 58a acquires job information by executing the augmented reality program 57a stored in the storage unit 57. The augmented reality unit 58b causes the display 52 to display a composite image where a job information image based on the job information acquired by the job information acquisition unit 58a is combined on a location corresponding to the MFP with a captured image captured by the imaging unit 53. The job moving unit 58c moves the print job between the plurality of MFPs, corresponding to the operation input by the operation unit 51 with respect to the job information image displayed on the display 52 by the augmented reality unit 58b.

Next, operations of the image forming system 10 will be described.

First, operations of the MFP 20 when receiving print data will be described.

Figure 6:
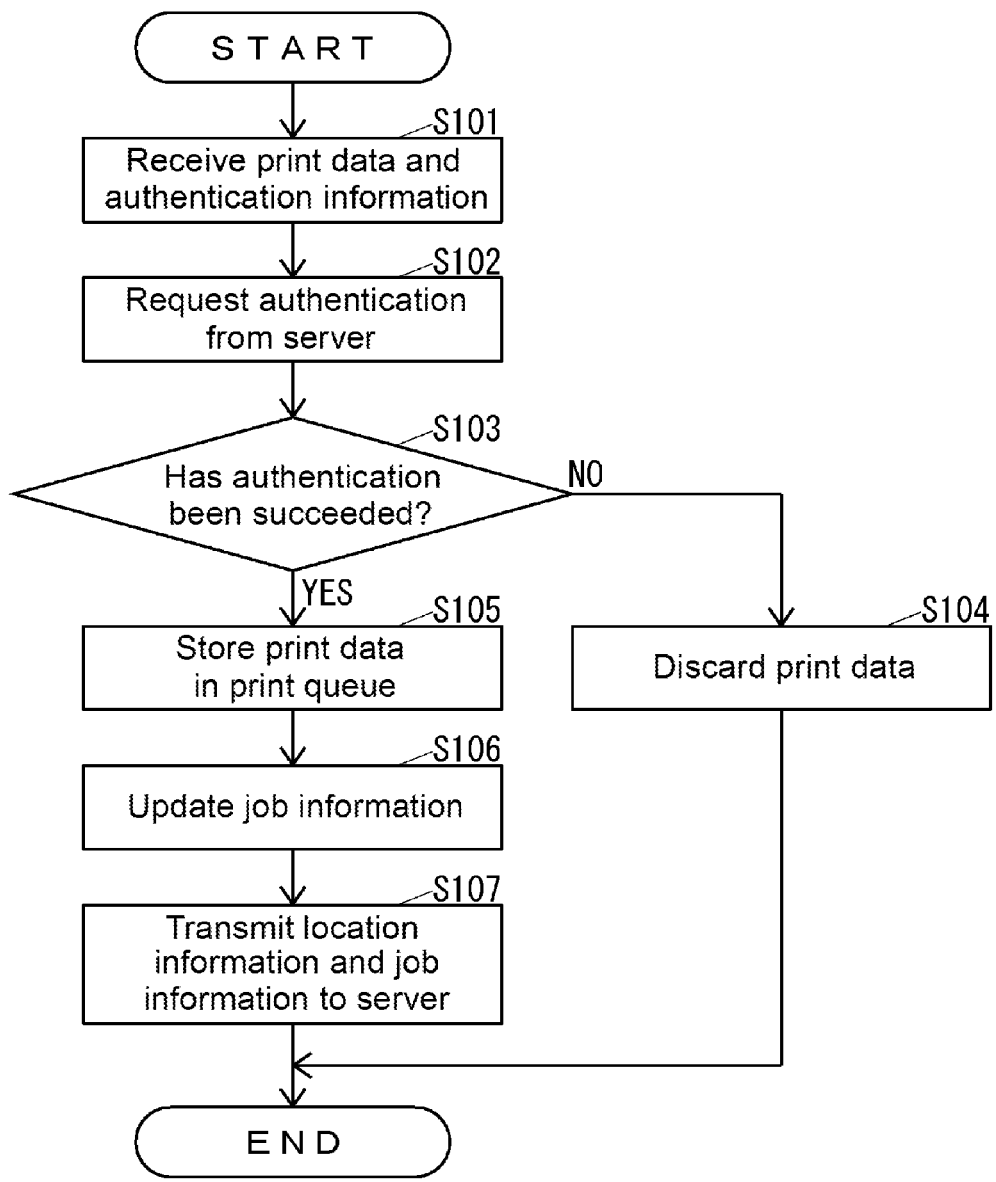
FIG. 6 illustrates a flowchart of operations of the MFP according to the one embodiment when the MFP receives print data.

FIG. 6 illustrates the operations of the MFP 20 when receiving the print data.

After the user transmits the print data from a computer (not illustrated) to the MFP 20, the MFP 20 executes the operations illustrated in the FIG. 6.

As illustrated in FIG. 6, the control unit 28 of the MFP 20 receives the transmitted print data and user authentication information transmitted being associated with this print data via the communication unit 26 (Step S101).

Next, the control unit 28 transmits the authentication information received at Step S101 to the server 40 via the communication unit 26 so as to request a user authentication from the server 40 (Step S102).

Here, after the control unit 45 of the server 40 receives the authentication information transmitted from the MFP 20 via the communication unit 43, the control unit 45 executes the user authentication based on the received authentication information. Specifically, when the received authentication information is included in the authentication information 44a on the storage unit 44, the control unit 45 determines that the user authentication has been succeeded, and when the received authentication information is not included, the control unit 45 determines that the user authentication has been failed. Then, the control unit 45 replies an authentication result to the MFP 20 via the communication unit 43.

After the process at Step S102, the control unit 28 receives the authentication result transmitted from the server 40 via the communication unit 26 so as to determine whether or not the received result is an authentication success (Step S103).

If the control unit 28 determines that the authentication has not been succeeded, that is, the authentication has been failed at Step S103, the control unit 28 discards the print data received at Step S101 (Step S104), and terminates the operations illustrated in FIG. 6.

If the control unit 28 determines that the authentication has been succeeded at Step S103, the control unit 28 stores the print data received at Step S101 in the last of the print queue 27c (Step S105), and updates the job information 27b with respect to the print data stored in the print queue 27c at Step S105 (Step S106).

Next, the control unit 28 transmits the location information 27a and the job information 27b to the server 40 via the communication unit 26 (Step S107), and terminates the operations illustrated in FIG. 6.

After the control unit 45 of the server 40 receives the location information and the job information transmitted from the MFP 20 at Step S107 via the communication unit 43, the control unit 45 stores the received location information and the received job information as the location information 44b and the job information 44c of the MFP 20 in the storage unit 44.

The MFP 20 may transmit the location information 27a to the server 40 by operations different from the operations illustrated in FIG. 6. For example, the MFP 20 may transmit periodically the location information 27a to the server 40.

Next, the operations of the MFP 20 when executing the print job will be described.

Figure 7:
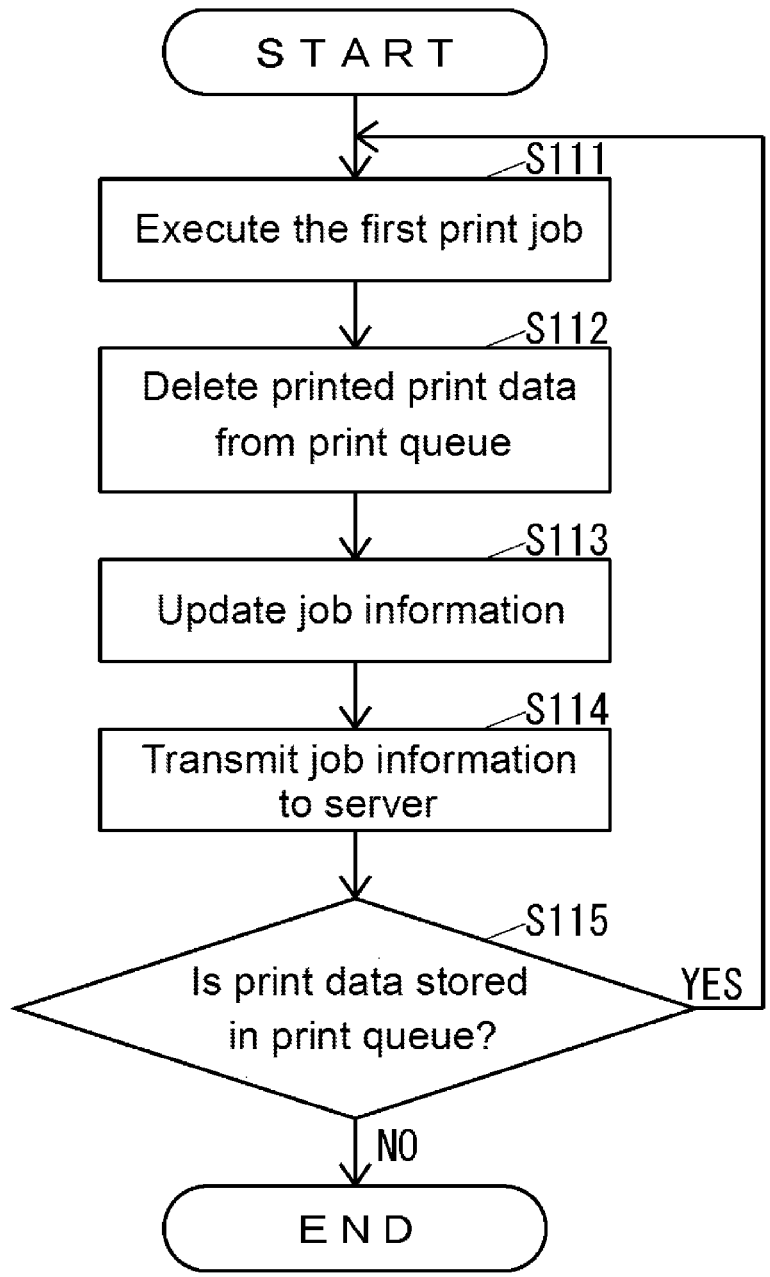
FIG. 7 illustrates a flowchart of operations of the MFP according to the one embodiment when the MFP executes a print job.

FIG. 7 illustrates the operations of the MFP 20 when executing the print job.

The MFP 20 executes the operations illustrated in FIG. 7 when the print data is stored in the print queue 27c.

As illustrated in FIG. 7, the control unit 28 of the MFP 20 prints by the printer 24 based on the beginning print data stored in the print queue 27c so as to execute the first print job illustrated on the job information 27b (Step S111).

Next, the control unit 28 deletes the print data printed at Step S111 from the print queue 27c (Step S112), and updates the job information 27b in order to reflect that the print data has been deleted from the print queue 27c at Step S112 (Step S113).

Next, the control unit 28 transmits the job information 27b to the server 40 via the communication unit 26 (Step S114).

Accordingly, after the control unit 45 of the server 40 receives the job information transmitted from the MFP 20 at Step S114 via the communication unit 43, the control unit 45 stores the received job information as the job information 44c of the MFP 20 in the storage unit 44.

After the process at Step S114, the control unit 28 of the MFP 20 determines whether or not the print data is stored in the print queue 27c (Step S115).

If the control unit 28 determines that the print data is stored in the print queue 27c at Step S115, the control unit 28 executes the process of Step S111.

If the control unit 28 determines that the print data is not stored in the print queue 27c at Step S115, the control unit 28 terminates the operations illustrated in FIG. 7.

The MFP 20 may transmit only changed contents of the job information 27b to the server 40 without transmitting all the job information 27b to the server 40 at the operations illustrated in FIG. 6 and the operations illustrated in FIG. 7. In this case, the server 40 can update the job information 44c of the MFP 20 based on the changed contents transmitted from the MFP 20.

Next, the operations of the mobile device 50 when acquiring the location information and the job information of the MFP will be described.

Figure 8:
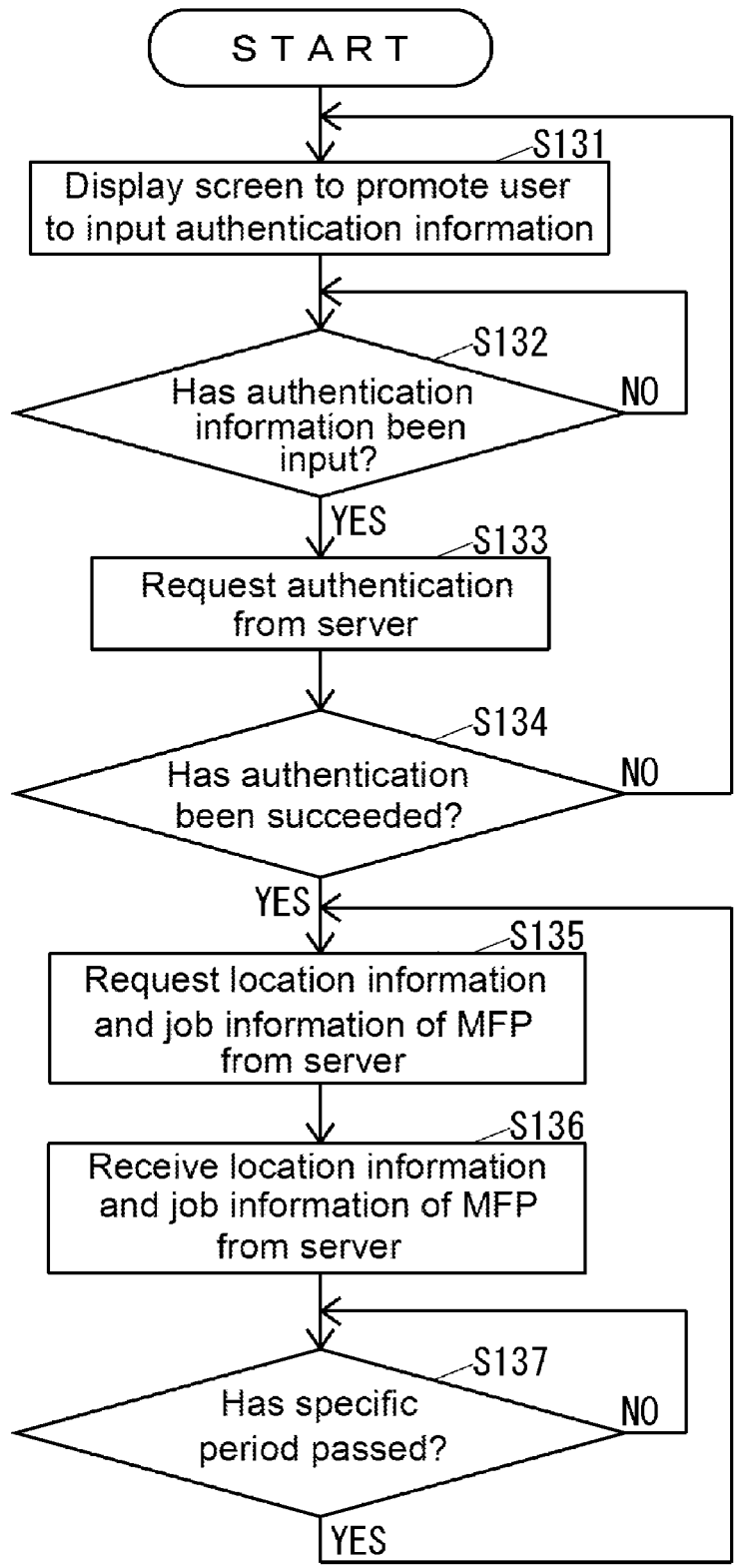
FIG. 8 illustrates a flowchart of operations of the mobile device according to the one embodiment when the mobile device acquires location information and the job information of the MFP.

FIG. 8 illustrates the operations of the mobile device 50 when acquiring the location information and the job information of the MFP.

The user of the mobile device 50 can instruct the mobile device 50 via the operation unit 51 to execute the augmented reality program 57a. After starting the execution of the augmented reality program 57a, the mobile device 50 executes the operations illustrated in FIG. 8.

As illustrated in FIG. 8, the job information acquisition unit 58a of the mobile device 50 displays a screen that promotes the user to input the authentication information on the display 52 (Step S131), and determines whether or not the authentication information has been input via the operation unit 51 until the job information acquisition unit 58a determines that the authentication information has been input via the operation unit 51 (Step S132).

If the job information acquisition unit 58a determines that the authentication information has been input at Step S132, the job information acquisition unit 58a transmits the authentication information input via the operation unit 51 to the server 40 via the wireless communication unit 54 so as to request the user authentication from the server 40 (Step S133).

Here, after the control unit 45 of the server 40 receives the authentication information transmitted from the mobile device 50 via the communication unit 43, the control unit 45 executes the above-described user authentication based on the received authentication information. Then, the control unit 45 replies the authentication result to the mobile device 50 via the communication unit 43. If the authentication has been succeeded, the control unit 45 causes an authentication target user to be logged in until the authentication target user logs out.

After the process at Step S133, the job information acquisition unit 58*a* receives the authentication result transmitted from the server 40 via the wireless communication unit 54 so as to determine whether or not the received result is the authentication success (Step S134).

If the job information acquisition unit 58*a* determines that the authentication has not been succeeded, that is, the authentication has been failed at Step S134, the job information acquisition unit 58*a* executes the process of Step S131.

If the job information acquisition unit 58*a* determines that the authentication has been succeeded at Step S134, the job information acquisition unit 58*a* requests the location information and the job information of the MFP, which is present within a captured range of the imaging unit 53, from the server 40 via the wireless communication unit 54, based on a location of the mobile device 50 detected by the location detecting unit 55 and a captured direction of the imaging unit 53 based on a direction detected by the direction detecting unit 56 (Step S135).

Accordingly, the control unit 45 of the server 40 replies the location information 44*b* and the job information 44*c* of the MFP requested at Step S135 to the mobile device 50 via the communication unit 43.

Then, after the job information acquisition unit 58*a* receives the location information and the job information of the MFP transmitted from the server 40 via the wireless communication unit 54 (Step S136), if the job information acquisition unit 58*a* determines that a specific period has passed at Step S137, the job information acquisition unit 58*a* executes the process of Step S135.

The mobile device 50, in the above, requests the location information and the job information of the MFP, which is present within a captured range of the imaging unit 53, from the server 40. However, the mobile device 50 may request the location information and the job information of the MFP, which is present within a specific range from the location of the mobile device 50 not limited to the captured range, from the server 40, and may request the location information and the job information of every MFP that the server 40 controls from the server 40.

Next, the operations of the mobile device 50 when ensuring an augmented reality will be described.

Figure 9:
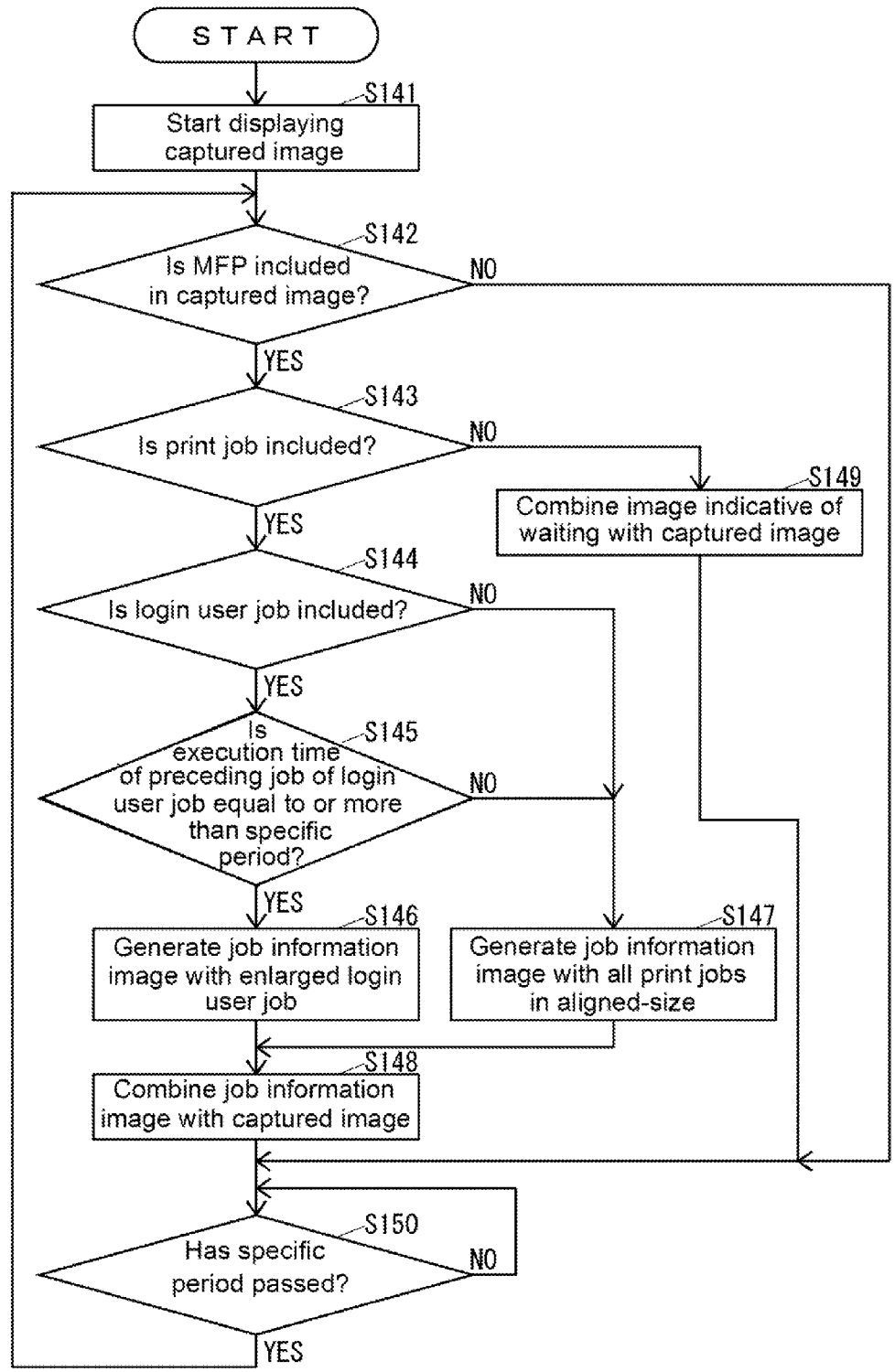
FIG. 9 illustrates a flowchart of operations of the mobile device according to the one embodiment when the mobile device ensures an augmented reality.

FIG. 9 illustrates the operations of the mobile device 50 when ensuring the augmented reality.

After starting the execution of the augmented reality program 57*a*, the mobile device 50 executes the operations illustrated in FIG. 9.

As illustrated in FIG. 9, the augmented reality unit 58*b* of the mobile device 50 starts displaying the captured image captured by the imaging unit 53 on the display 52 (Step S141).

Next, the augmented reality unit 58*b* determines whether or not the MFP is included in the captured image captured by the imaging unit 53, based on a location of the mobile device 50 detected by the location detecting unit 55, a captured direction of the imaging unit 53 based on a direction detected by the direction detecting unit 56, and the location information of the MFP acquired at S136 (Step S142).

If the augmented reality unit 58*b* determines that the MFP is included in the captured image at Step S142, the augmented reality unit 58*b* determines whether or not the print job is included in the job information of the MFP included in the captured image based on the job information acquired at Step S136 (Step S143).

If the augmented reality unit 58*b* determines that the print job is included at Step S143, the augmented reality unit 58*b* determines whether or not the print job associated with a user ID of the logged-in user (hereinafter referred to as a "login user job") is included in the job information of the MFP included in the captured image (Step S144).

If the augmented reality unit 58*b* determines that the login user job is included at Step S144, the augmented reality unit 58*b* determines whether or not an execution time of the print job to be executed by the MFP prior to the login user job (hereinafter referred to as a "preceding job") is equal to or more than a specific period, for example, two minutes, in the job information of the MFP included in the captured image (Step S145).

Here, the augmented reality unit 58*b* can calculate the execution time of the print job by dividing the total number of printed sheets, which multiplies the number of printed sheets per copy on the print job by the number of copies on the print job, by the printing speed of the MFP.

For example, if the MFP included in the captured image is the MFP 20, the most recent job information received at Step S136 is identical to the job information 27*b* illustrated in FIG. 3 for the MFP 20, and the user ID of the logged-in user is USER001, the login user job is the fifth print job. Then, the total number of printed sheets of the first print job is 10 pages×1 copy=10 pages. Similarly, the total numbers of printed sheets of the second, third, and fourth print job are 200, 5, and 200 respectively. Accordingly, the total number of printed sheets of the preceding job of the login user job is 415. Here, when the printing speed of the MFP 20 is 20 ppm (pages per minute), the execution time of the preceding job of the login user job is 415 pages÷20 ppm=20.75 minutes.

The printing speed of the MFP may be controlled for each MFP by the server 40 and transmitted to the mobile device 50 from the server 40, and may be controlled for each MFP by the mobile device 50.

Figure 10:
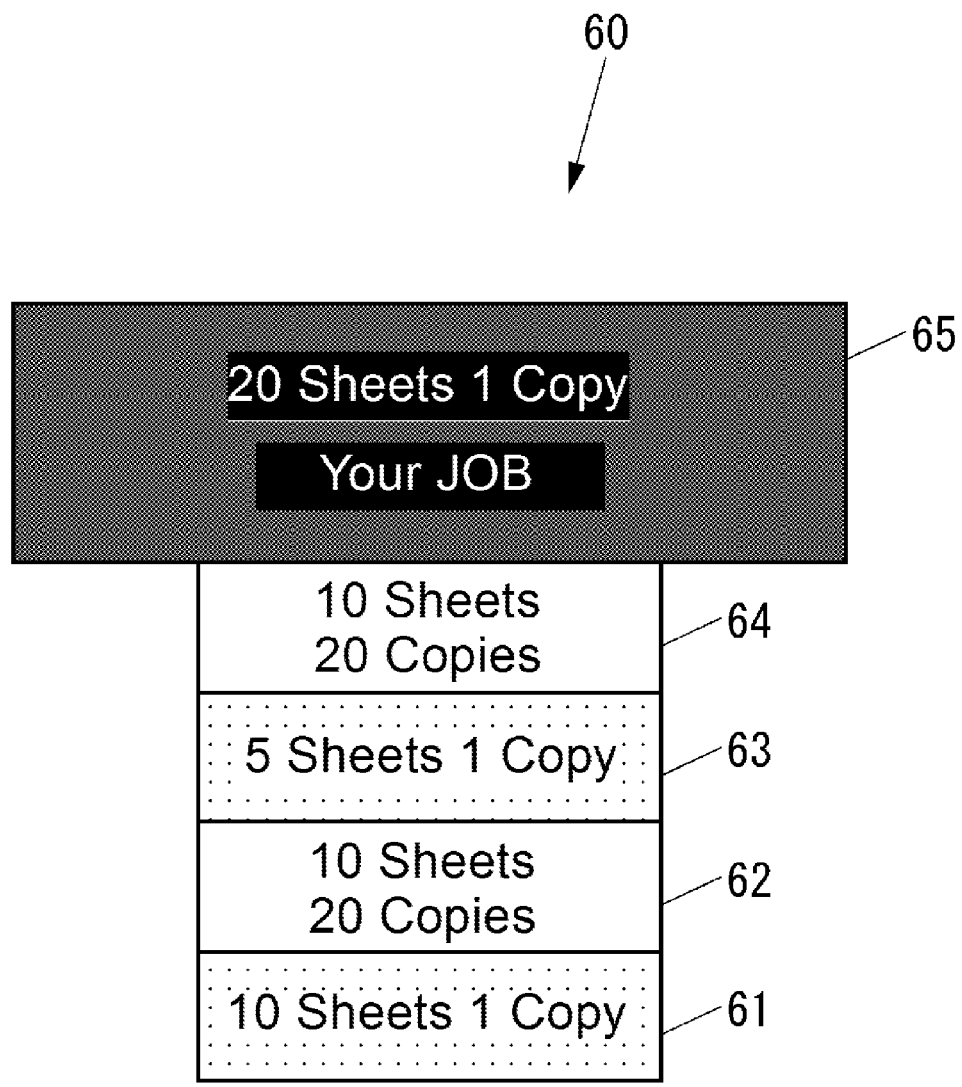
FIG. 10 illustrates a schematic diagram of an exemplary job information image generated by the mobile device according to the one embodiment when an execution time of a preceding job of a login user job is equal to or more than a specific period.

If the augmented reality unit 58*b* determines that the execution time is equal to or more than the specific period at Step S145, the augmented reality unit 58*b*, for example, as illustrated in FIG. 10, generates a job information image 60 with enlarged login user job compared with the other print jobs (Step S146).

On the job information image 60 illustrated in FIG. 10, fields 61 to 65 each illustrate a print job. The fields 61 to 65 illustrate that the lower arranged field is the earlier print job in the order executed by the MFP. The fields 61 to 65 include the number of printed sheets per copy on the print job and the number of copies on the print job. The print jobs illustrated in the fields 61 to 64 are not the login user job. The print job illustrated in the field 65 is a login user job. The field 65 is larger than any of the fields 61 to 64, and the background color of the field 65 is different from any of the background colors of the fields 61 to 64. The field 65 includes a character string "Your JOB" indicative of the login user job. On the other hand, the fields 61 to 64 do not include information indicative of the print job of any user.

Figure 11A:
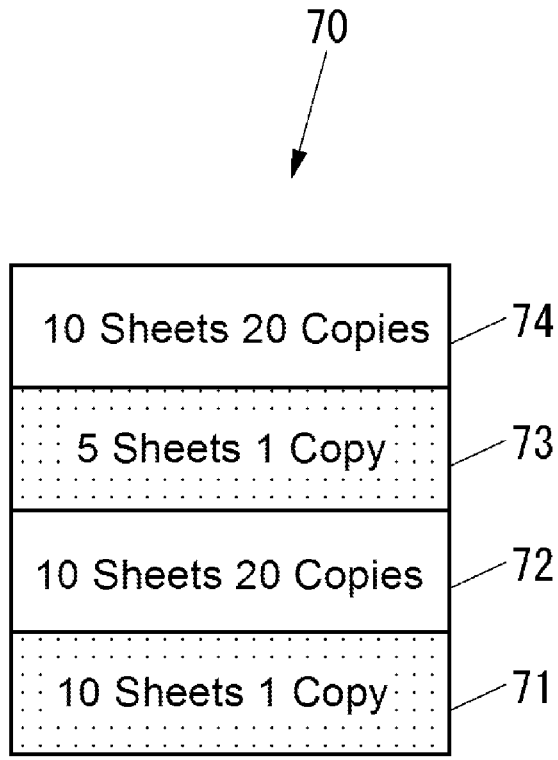
FIG. 11A illustrates an exemplary job information image generated by the mobile device according to the one embodiment when the login user job is not included.
Figure 11B:
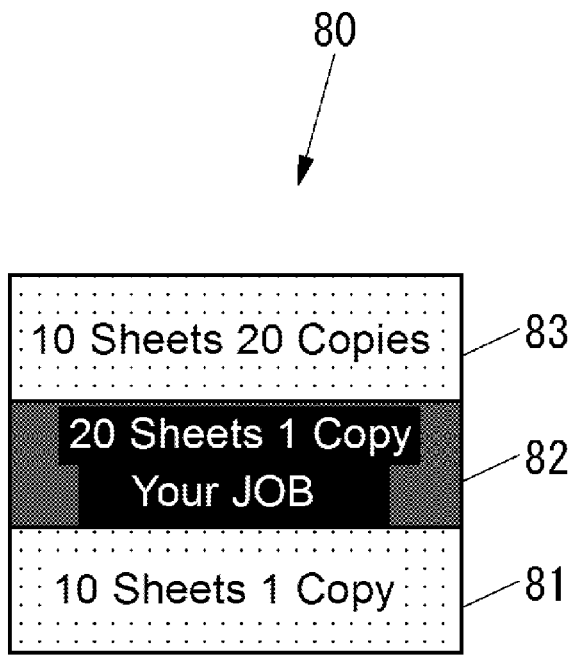
FIG. 11B illustrates a schematic diagram of an exemplary job information image generated by the mobile device according to the one embodiment when the execution time of the preceding job of the login user job is less than the specific period.

If the augmented reality unit 58*b* determines that the login user job is not included at Step S144, or determines that the execution time is less than the specific period at Step S145, the augmented reality unit 58*b*, for example, as illustrated in FIGS. 11A and 11B, generates a job information image with all print jobs in aligned-size (Step S147).

FIG. 11A illustrates an exemplary job information image 70 when not including the login user job. On the job information image 70, fields 71 to 74 each illustrate a print job. The field 71 to 74 illustrate that the lower arranged field is the earlier print job in the order executed by the MFP. The field 71 to 74 include the number of printed sheets per copy on the print job and the number of copies on the print job. The print jobs illustrated in the fields 71 to 74 are not the login user job. The fields 71 to 74 do not include information indicative of the print job of any user.

FIG. 11B illustrates an exemplary job information image 80 when the execution time of the preceding job of the login user job is less than the specific period. On the job information image 80, fields 81 to 83 each illustrate a print job. The fields 81 to 83 illustrate that the lower arranged field is the earlier print job in the order executed by the MFP. The fields 81 to 83 include the number of printed sheets per copy on the print job and the number of copies on the print job. The print jobs illustrated in the fields 81 and 83 are not the login user job. The print job illustrated in the field 82 is a login user job. The background color of the field 82 is different from the background colors of any of the fields 81 and 83. The field 82 includes a character string "Your JOB" indicative of the login user job. On the other hand, the fields 81 and 83 do not include information indicative of the print job of any user. The size of the field 82 is, unlike the size of the field 65 of the job information image 60 illustrated in FIG. 10, identical to the sizes of the fields 81 and 83. That is, the job information image 80 is, unlike the job information image 60, aborted to illustrate the login user job larger than the other print jobs.

Figure 12:
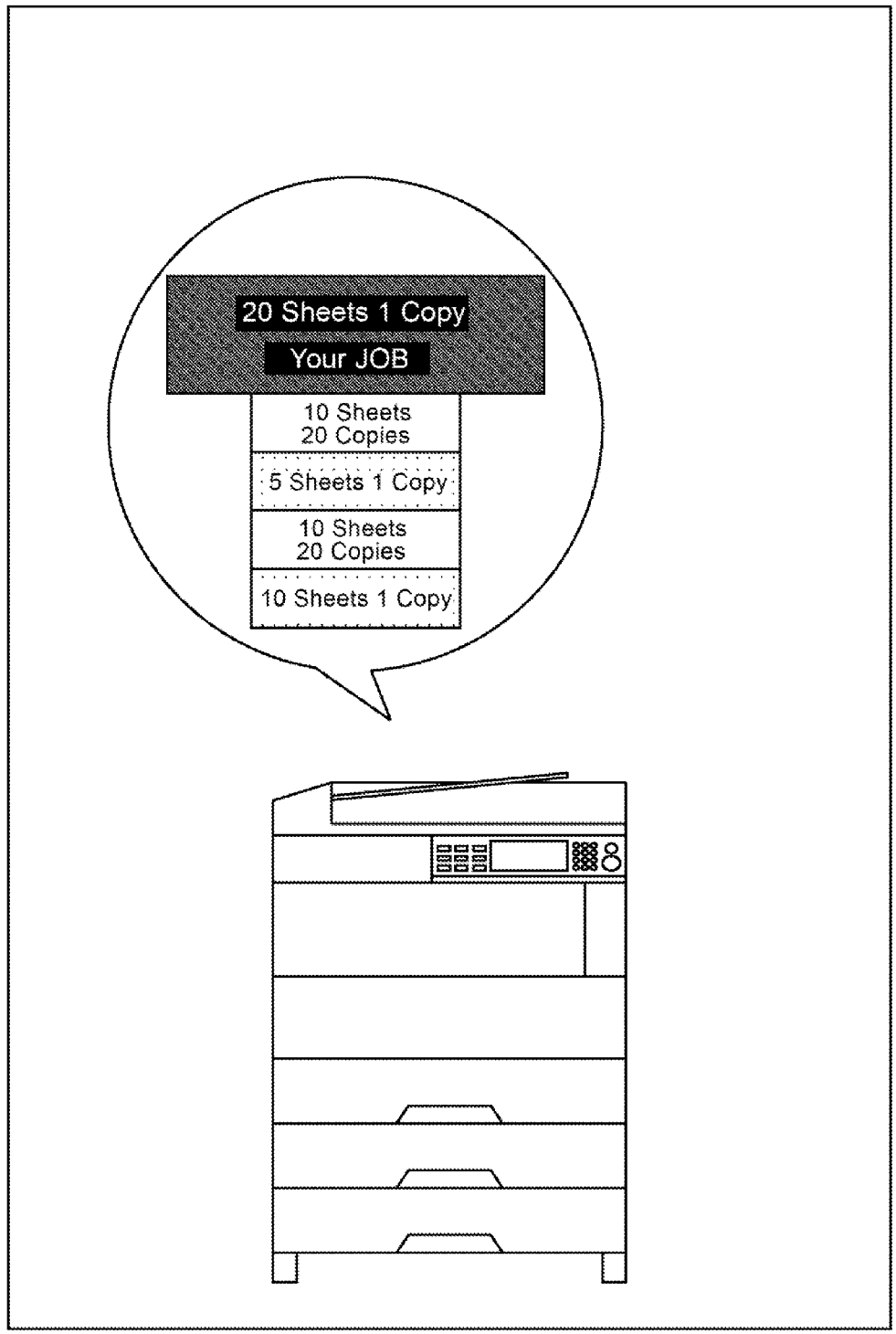
FIG. 12 illustrates a schematic diagram of an exemplary composite image where the mobile device according to the one embodiment combines the job information image with a captured image.

After the augmented reality unit 58b generates the job information image at Step S146 or Step S147, the augmented reality unit 58b combines the job information image generated at Step S146 or Step S147 with the captured image (Step S148). Here, the augmented reality unit 58b combines the job information image generated at Step S146 or Step S147 on the location corresponding to the MFP targeted for this job information image. Accordingly, on the display 52, for example, as illustrated in FIG. 12, the composite image generated at Step S148 is displayed.

Figure 13:
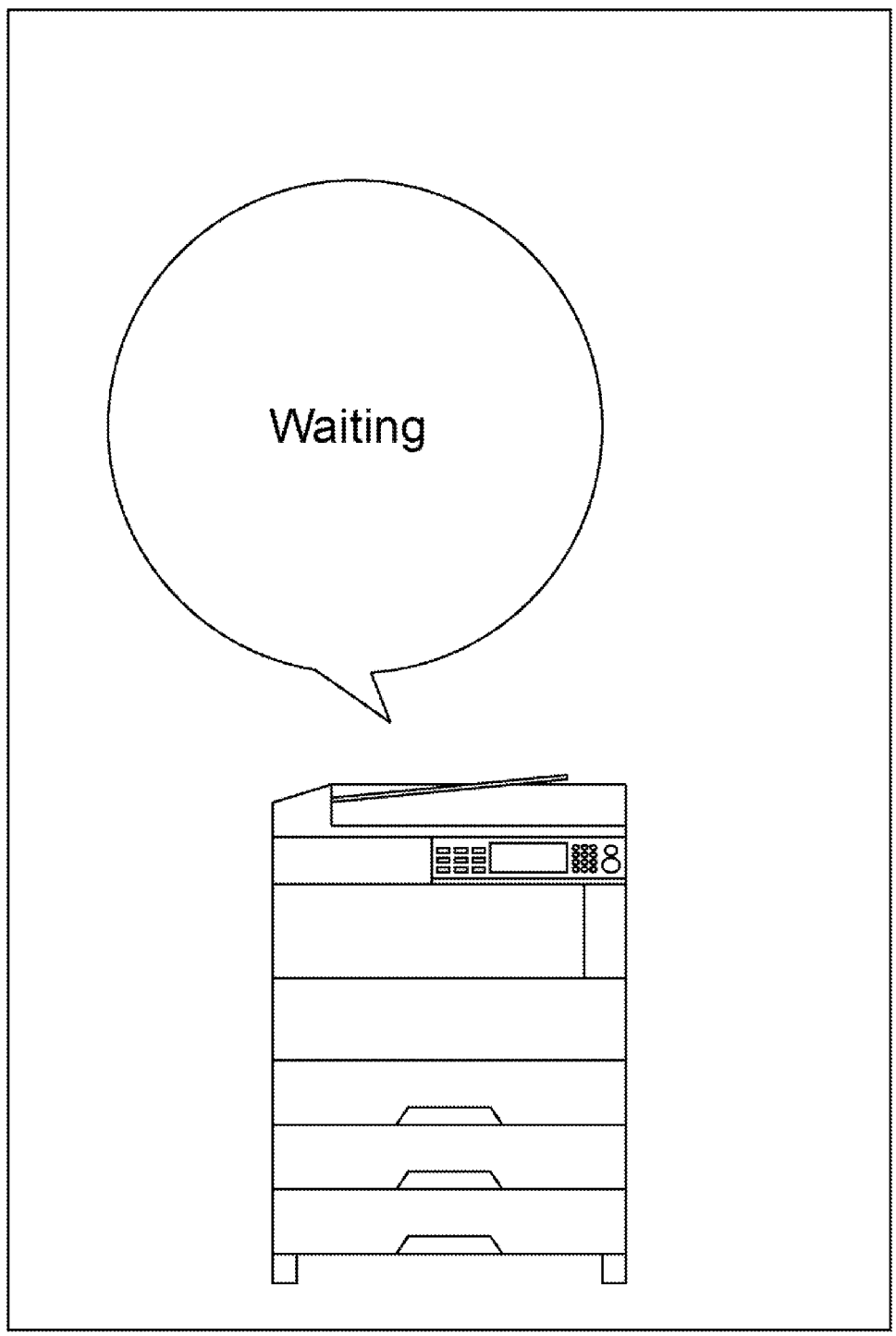
FIG. 13 illustrates a schematic diagram of an exemplary composite image where the mobile device according to the one embodiment combines an image indicative of a waiting with the captured image.

If the augmented reality unit 58b determines that the print job is not included at Step S143, the augmented reality unit 58b combines an image indicative of waiting with the captured image (Step S149). Here, the augmented reality unit 58b combines the image indicative of waiting on the location corresponding to the MFP targeted for this image. Accordingly, on the display 52, for exemplary, as illustrated in FIG. 13, the composite image generated at Step S149 is displayed.

If the augmented reality unit 58b determines that the MFP is not included in the captured image at Step S142, or after the process of Step S148 or Step S149 has been executed, determines that the specific period has passed at S150, the augmented reality unit 58b executes the process of Step S142.

Next, the operations of the mobile device 50 when moving the print job between the plurality of MFPs will be described.

Figure 14:
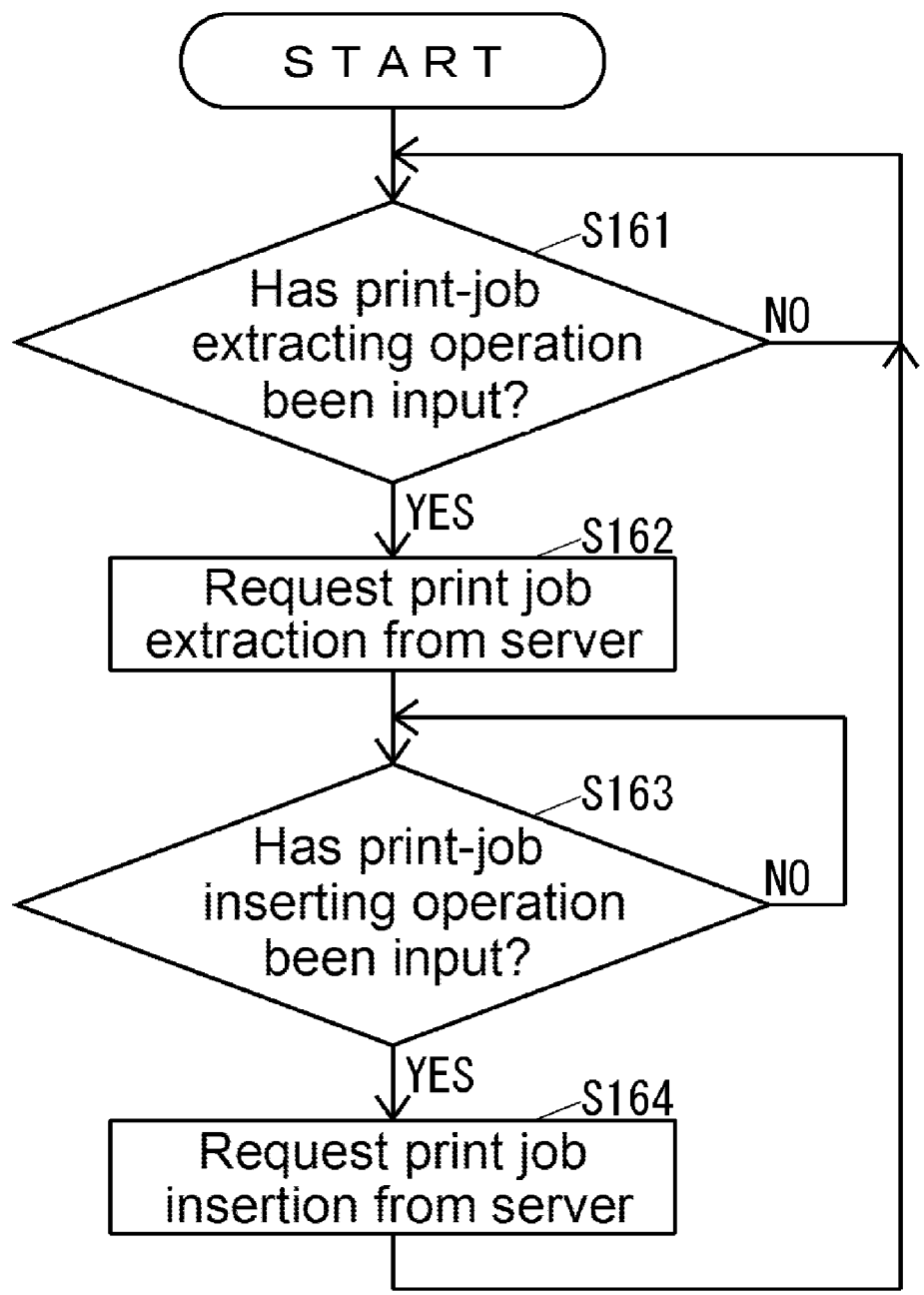
FIG. 14 illustrates a flowchart of operations of the mobile device according to the one embodiment when the mobile device moves the print job between a plurality of MFPs.

FIG. 14 illustrates the operations of the mobile device 50 when moving the print job between the plurality of MFPs.

As illustrated in FIG. 14, the job moving unit 58c of the mobile device 50, with respect to the job information image displayed on the display 52, determines whether or not a print-job extracting operation has been input on the operation unit 51 until the job moving unit 58c determines that the print-job extracting operation has been input on the operation unit 51 (Step S161).

Figure 15A:
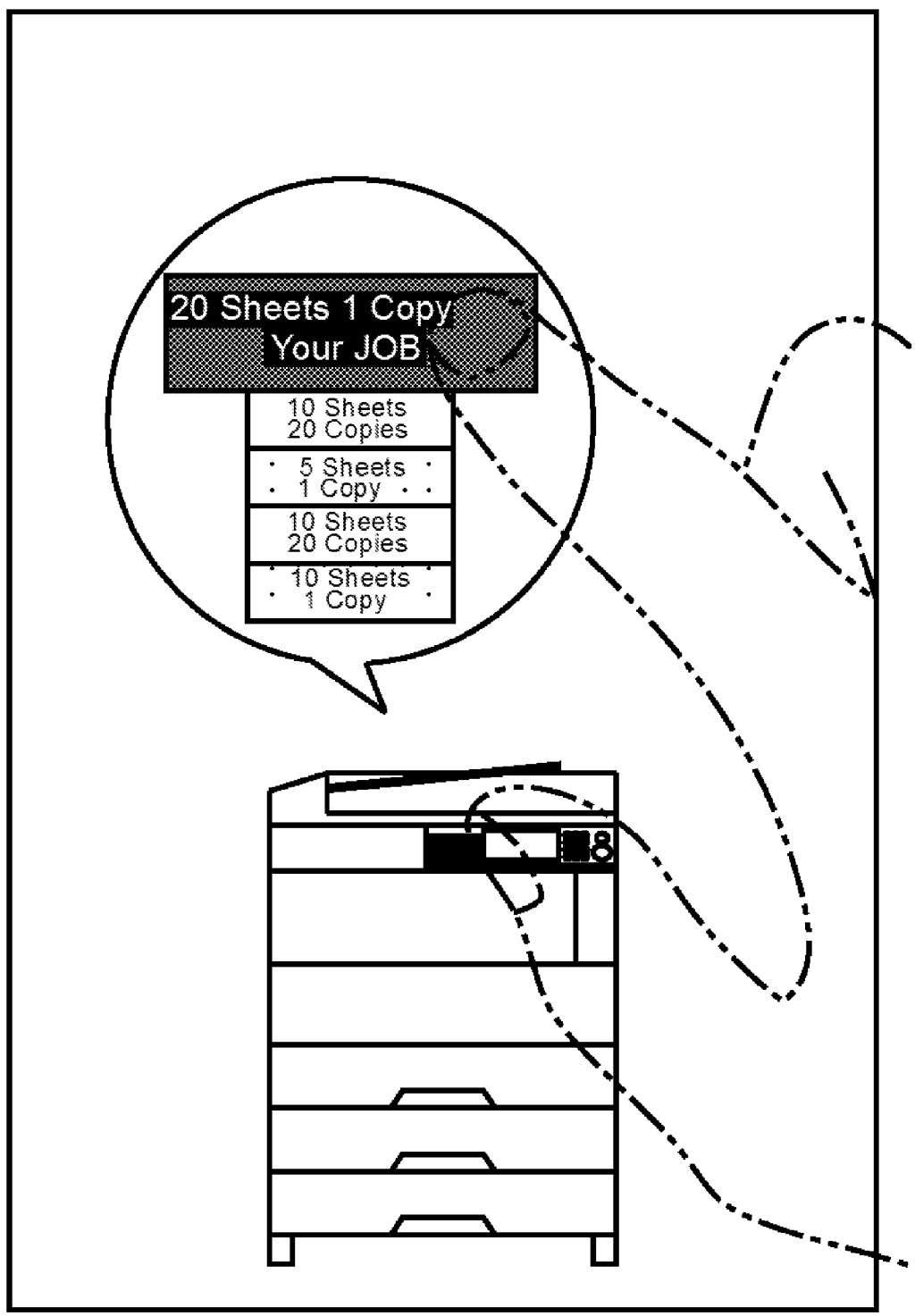
FIG. 15A illustrates a schematic diagram of an exemplary state where a user is touching the composite image illustrated in FIG. 12.
Figure 15B:
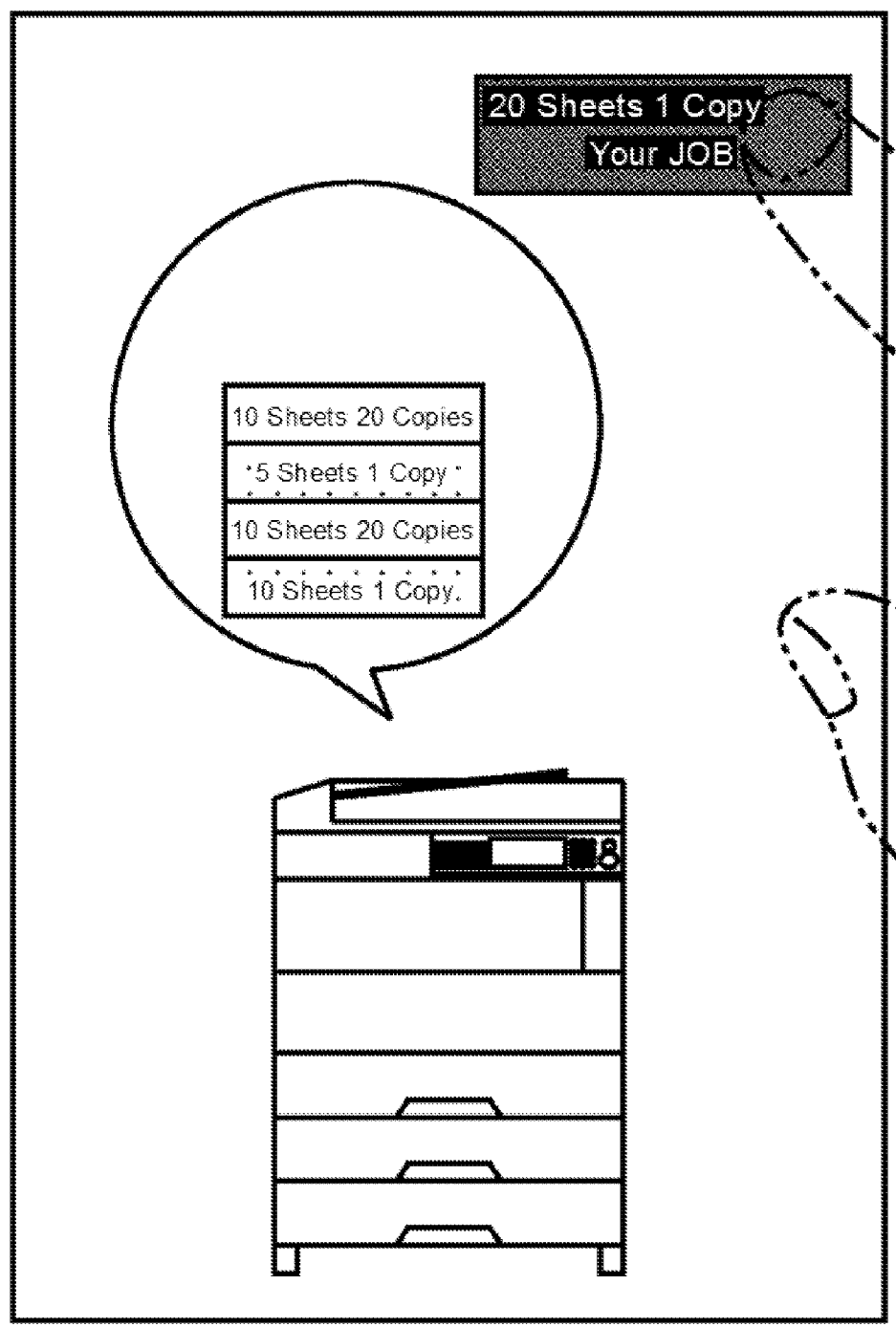
FIG. 15B illustrates a schematic diagram of an exemplary state where a swipe was executed from the state illustrated in FIG. 15A.

For example, the user can input the print-job extracting operation on the operation unit 51 as illustrated in FIGS. 15A and 15B. That is, when the composite image illustrated in FIG. 12 is displayed on the display 52, after the user touches a region corresponding to any field of the job information image on the display 52, which is a touch panel, as illustrated in FIG. 15A, the user can extract the field from the job information image by swiping as illustrated in FIG. 15B.

If the job moving unit 58c determines that the print-job extracting operation has been input on the operation unit 51 at Step S161, the job moving unit 58c requests the print-job extraction corresponding to the operation input by the operation unit 51 from the server 40 via the wireless communication unit 54 (Step S162).

After the control unit 45 of the server 40 receives the request from the mobile device 50 at Step S162 via the communication unit 43, the control unit 45 updates the job information 44c of the target MFP corresponding to the request from the mobile device 50, and requests the print-job extraction requested from the mobile device 50 from the target MFP via the communication unit 43. Accordingly, the control unit of the target MFP updates the print queue and the job information of the control unit itself corresponding to the request from the server 40. The control unit of the target MFP holds the print data extracted from the print queue of the control unit itself in a region other than the print queue on the storage unit of the control unit itself.

After the process at Step S162, the job moving unit 58c, with respect to the job information image displayed on the display 52, determines whether or not a print-job inserting operation has been input on the operation unit 51 until the job moving unit 58c determines that the print-job inserting operation has been input on the operation unit 51 (Step S163).

Figure 16:
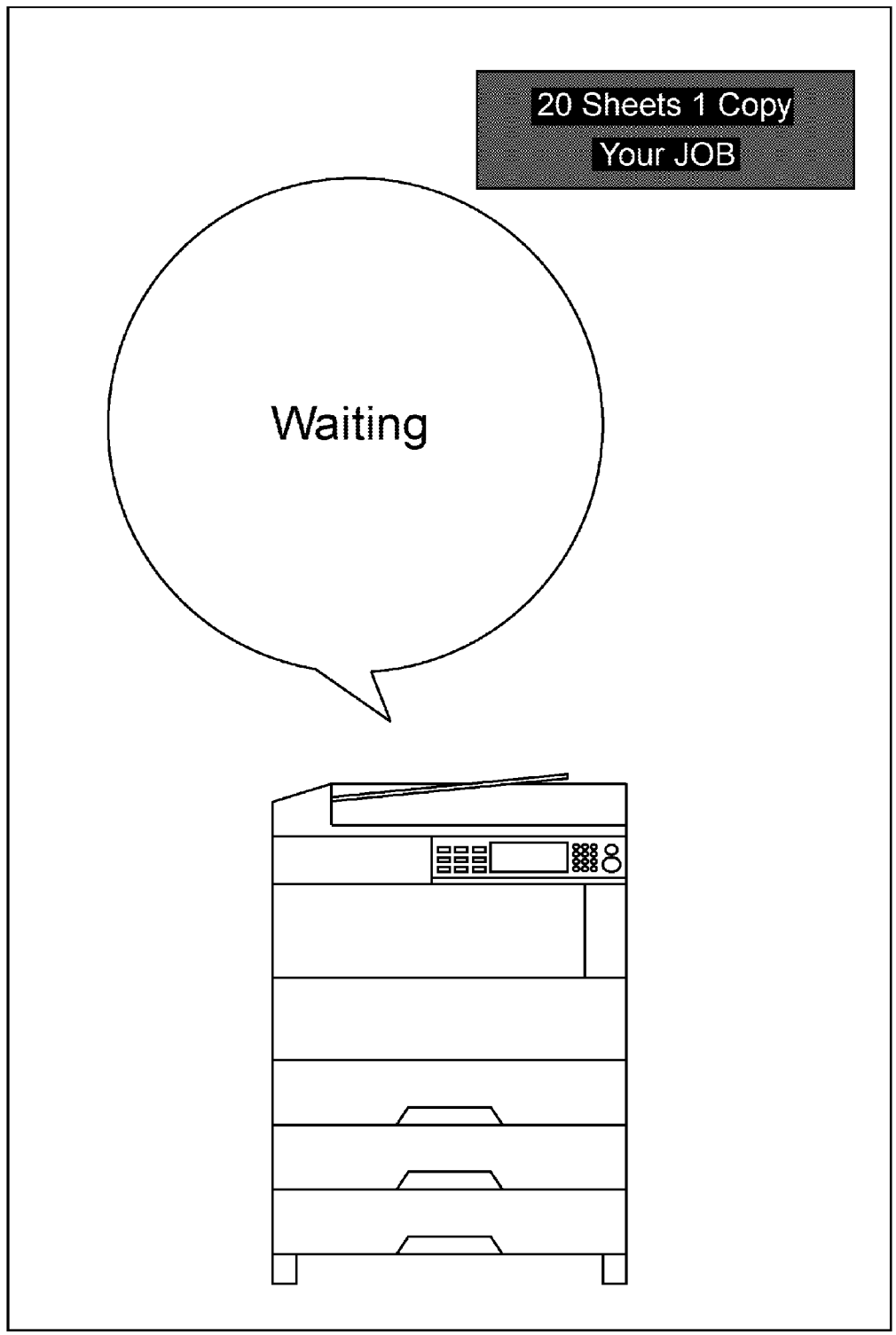
FIG. 16 illustrates a schematic diagram of an exemplary composite image when a target MFP for the composite image illustrated in FIG. 13 is displayed on a display in a state where the print job being extracted.
Figure 17A:
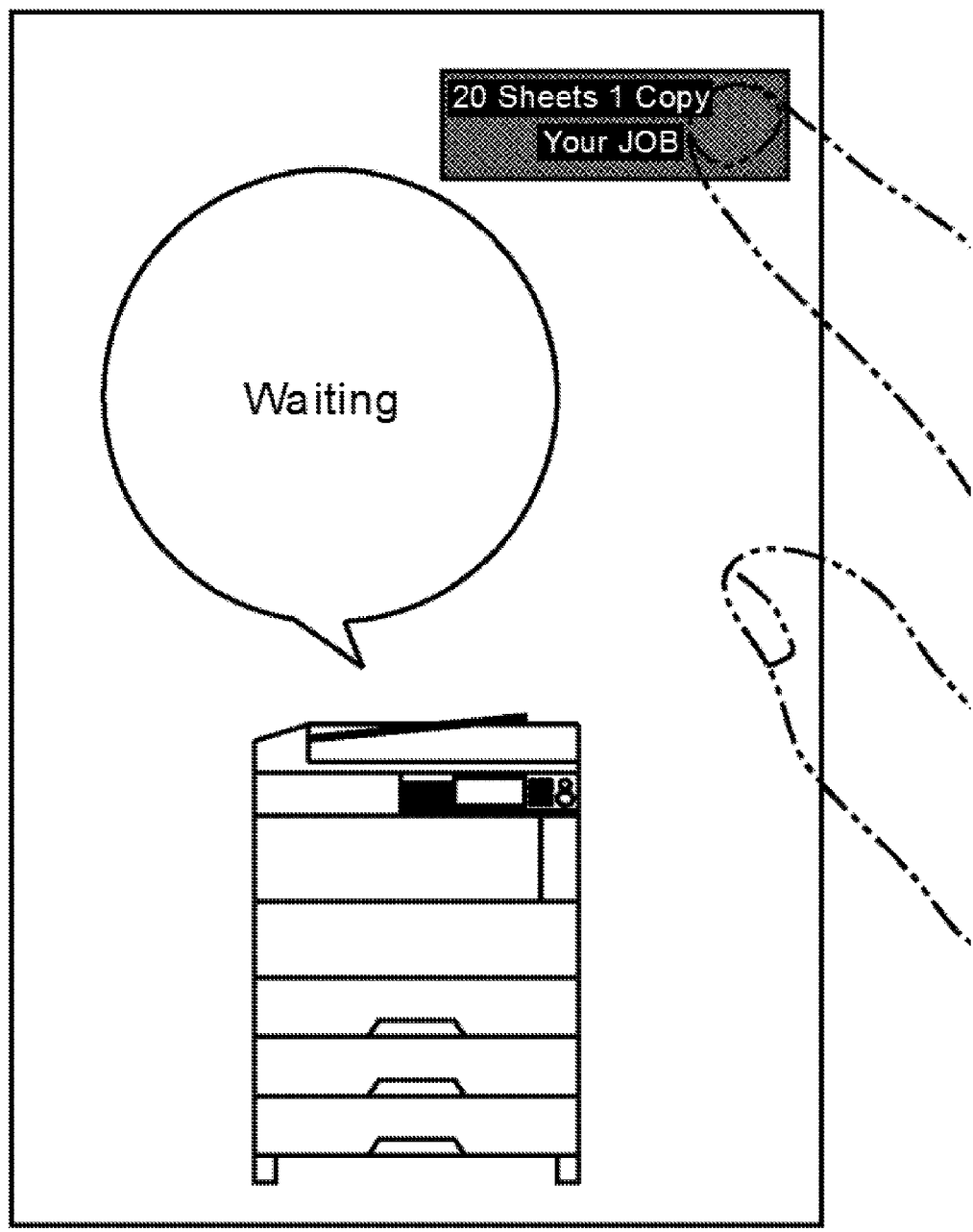
FIG. 17A illustrates a schematic diagram of an exemplary state where the user is touching the composite image illustrated in FIG. 16.

For example, the user can input the print-job inserting operation on the operation unit 51 as illustrated in FIGS. 16, 17A and 17B. That is, the user firstly causes the display 52 to display the composite image illustrated in FIG. 16 in a state where the field is extracted from the job information image as illustrated in FIG. 15B, by changing the location and the direction in a real space of the mobile device 50 so that the MFP targeted for the composite image illustrated in FIG. 13 is displayed on the display 52. And, when the composite image illustrated in FIG. 16 is displayed on the display 52, after the user touches the region corresponding to the field, which has been extracted from the job information image, on the display 52, which is a touch panel, as illustrated in FIG. 17A, the user can insert the field into a new job information image by swiping as illustrated in FIG. 17B.

If the job moving unit 58c determines that the print-job inserting operation has been input on the operation unit 51 at Step S163, the job moving unit 58c requests the print-job insertion corresponding to the operation input by the operation unit 51 from the server 40 via the wireless communication unit 54 (Step S164), and executes the process of Step S161.

If the control unit 45 of the server 40 receives the request from the mobile device 50 at Step S164 via the communication unit 43, the control unit 45 updates the job information 44c of the target MFP corresponding to the request from the mobile device 50, and requests the print-job insertion requested from the mobile device 50 from the target MFP and the MFP that has extracted the print job via the communication unit 43. Accordingly, the MFP that has extracted the print job transmits the print data, which has been extracted from the print queue of the MFP that has extracted the print job itself, to the target MFP. The control unit of the target MFP updates the job information of the control unit itself corresponding to the request from the server 40, and inserts the print data transmitted from the MFP that has extracted the print job, into the print queue of the control unit itself.

In the above, while after extracting the field from the job information image, the location and the direction in a real space of the mobile device 50 are changed, when the print job source MFP and the destination MFP are included in one composite image, the location and the direction in a real space of the mobile device 50 need not be changed.

As described above, since the image forming system 10 moves the print job between the plurality of MFPs corresponding to the operation input by the operation unit 51 with respect to the job information image displayed on the display 52 by combining on the location corresponding to the MFP on the captured image captured by the imaging unit 53, the image forming system 10 can move easily the print job between the plurality of MFPs.

Since the image forming system 10 includes the order that the print jobs will be executed by the MFP in the composite image, the image forming system 10 can causes easily the user to determine whether or not the print job is moved to the other MFP.

Since the image forming system 10 displays the login user job larger than the other print jobs on the job information image, which causes the display 52 to display (Step S146 and Step S148), the image forming system 10 can facilitate a moving operation of the login user job.

Especially, since the image forming system 10 displays the login user job larger than the other print jobs on the job information image displayed on the display 52, which is a touch panel, the image forming system 10 can facilitate a touch on the login user job on the touch pane, and can facilitate the moving operation of the login user job.

Since the image forming system 10 can execute the moving operation of the login user job on the display 52, which is a touch panel, the image forming system 10 can also facilitate the moving operation of the print job with respect to an MFP not including a touch panel.

The image forming system 10, even when the display 52 is not a touch panel, can execute a moving operation with respect to the print job displayed on the display 52.

Since only when the amount of the preceding job of the login user job is equal to or more than a specific amount (YES at Step S145), the image forming system 10 displays the login user job larger than the other print jobs, if the time until when the login user job is executed by the MFP is long, the image forming system 10 can cause the user to determine easily to move the login user job to the other MFP.

Especially, since when the login user job is executed by the MFP after equal to or more than the specific period has passed, the image forming system 10 displays the login user job larger than the other print jobs, if the time until when the login user job is executed by the MFP is long, the image forming system 10 can cause the user to determine easily to move the login user job to the other MFP.

On the image forming system 10, as the amount of the preceding job of the login user job, an amount other than the execution time of the print job may be adopted. For example, on the image forming system 10, the total number of printed sheets of the preceding job of the login user job or the number of the jobs of the preceding job of the login user job may be adopted as the amount of the preceding job of the login user job.

The image forming system 10 may display the login user job larger than the other print jobs regardless of whether or not the amount of the preceding job of the login user job is equal to or more than the specific amount. The user, if the print job of the user itself is displayed larger than the other print jobs can execute easily the moving operation of the print job, for example, so that the print job of the user itself is printed as a priority.

While on the image forming system 10, the job information image displayed on the mobile device 50 is generated by the mobile device 50 itself, the job information image displayed on the mobile device 50 may be generated by the server 40.

While on the image forming system 10, in this embodiment, as an augmented reality method, a location-based AR based on location information is adopted, a vision-based AR based on an image processing may be adopted.

On the image forming system 10, at least a part of the functions of the server 40 may be ensured by at least one of the plurality of MFPs. When all the functions of the server 40 are ensured by at least one of the plurality of MFPs, the image forming system 10 may not include the server 40. For example, on the image forming system 10, each MFP and the mobile device 50 may execute information exchange directly.

While the image forming system 10, in this embodiment, includes an MFP as an image forming apparatus of this disclosure, the image forming system 10 may include an image forming apparatus other than the MFP such as a printer-only machine as an image forming apparatus of this disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
    a portable terminal device that includes an imaging device, a display device, and an input device;
    a plurality of image forming apparatuses that execute print jobs; and
    a server that is connected with the portable terminal device and the plurality of image forming apparatuses via a network;
    the portable terminal device including
        a job information acquisition circuit that acquires job information about the print jobs executed by the plurality of image forming apparatuses,
        an augmented reality circuit that causes the display device to display a composite image where job information images based on the job information acquired by the job information acquisition circuit are combined on an image-forming-apparatus image captured by the imaging device, and
        a job moving circuit that moves the print jobs among the plurality of image forming apparatuses corresponding to an operation input by the input device with respect to the job information images displayed on the display device by the augmented reality circuit; wherein the server stores job information about the print jobs, for each of the plurality of image forming apparatuses included in the image forming system;

the job information includes a print-job sequence for execution by a target one of the plurality of image forming apparatuses, and for each of the print jobs, the number of printed sheets per copy on the print job, and the number of copies on the print job;

the job information acquisition circuit requests the server to acquire the job information of any of the plurality of image forming apparatuses present within a range captured by the imaging device;

the server reports the job information to the portable terminal device;

the augmented reality circuit calculates an execution time of print jobs preceding a login user's print job, by dividing the total number of printed sheets, which multiplies the number of printed sheets per copy on the print job by the number of copies on the print job for each of the preceding print jobs, by a printing speed of the image forming apparatus;

the augmented reality circuit generates, if the augmented reality circuit determines that the calculated execution time is equal to or more than a specific period, a job information image including the login user's print job enlarged compared with the other print jobs;

the display device is caused to display a composite image where a field of the login user's print job is extracted from the job information image, by changing a location and a direction in a real space of the portable terminal device so that the target one of the plurality of image forming apparatuses for the composite image is displayed on the display device;

the field of the login user print job, which is displayed having been extracted from the job information image on the display device, is inserted into a new job information image of the target image forming apparatus, by swiping via the input device;

the job moving circuit requests the server to insert the login user print-job into the target image forming apparatus from the image forming apparatus for which the field of the login user print job has been extracted;

the server makes a request for insertion of the login user print job to both the target image forming apparatus and the image forming apparatus for which the field of the login user print job has been extracted; and the image forming apparatus for which the field of the login user print job has been extracted transmits the login user print job to the target image forming apparatus via the network.

2. The image forming system according to claim 1, wherein the input device includes a touch panel with the display device.

3. An image forming method by an image forming system, the image forming system including: i) a portable terminal device that includes an imaging device, a display device, and an input device; ii) a plurality of image forming apparatuses that execute print jobs; and iii) a server that is connected with the portable terminal device and the plurality of image forming apparatuses via a network, the method comprising:

via the portable terminal device, acquiring job information about the print jobs executed by the plurality of image forming apparatuses;

causing the display device to display a composite image where job information images based on the job information are combined on an image-forming-apparatus image captured by the imaging device; and moving the print jobs among the plurality of image forming apparatuses corresponding to an operation input by the input device with respect to the job information images displayed on the display device, wherein the method further comprising:

via the server, storing job information about the print jobs, for each of the plurality of image forming apparatuses included in the image forming system, wherein the job information includes a print-job sequence for execution by a target one of the plurality of image forming apparatuses, and for each of the print jobs, the number of printed sheets per copy on the print job, and the number of copies on the print job, via the portable terminal device, requesting the server to acquire the job information of any of the image forming apparatuses present within a range captured by the imaging device, via the server, reporting the job information to the portable terminal device, via the portable terminal device, calculating an execution time of print jobs preceding a login user's print job, by dividing the total number of printed sheets, which multiplies the number of printed sheets per copy on the print job by the number of copies on the print job for each of the preceding print jobs, by a printing speed of the image forming apparatus;

generating, if the calculated execution time is equal to or more than a specific period, a job information image including the login user's print job enlarged compared with the other print jobs;

displaying a composite image where a field of the login user print job is extracted from the job information image, by changing a location and a direction in a real space of the portable terminal device so that the target one of the plurality of image forming apparatuses for the composite image is displayed on the display device, wherein the field of the login user print job, which is displayed having been extracted from the job information image on the display device, is inserted into a new job information image of the target image forming apparatus, by swiping via the input device; and requesting the server to insert the login user print-job into the target image forming apparatus from the image forming apparatus for which the field of the login user print job has been extracted, via the server, making a request for insertion of the login user print job to both the target image forming apparatus and the image forming apparatus for which the field of the login user print job has been extracted, and via the image forming apparatus for which the field of the login user print job has been extracted, transmitting the login user print job to the target image forming apparatus via the network.

* * * * *